US007957955B2

(12) United States Patent
Christie et al.

(10) Patent No.: US 7,957,955 B2
(45) Date of Patent: Jun. 7, 2011

(54) METHOD AND SYSTEM FOR PROVIDING WORD RECOMMENDATIONS FOR TEXT INPUT

(75) Inventors: Greg Christie, San Jose, CA (US); Bas Ording, San Francisco, CA (US); Scott Forstall, Mountain View, CA (US); Kenneth Kocienda, Sunnyvale, CA (US); Richard Williamson, Los Gatos, CA (US); Jerome René Bellegarda, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 720 days.

(21) Appl. No.: 11/620,641

(22) Filed: Jan. 5, 2007

(65) Prior Publication Data

US 2008/0167858 A1 Jul. 10, 2008

(51) Int. Cl.
*G06F 17/27* (2006.01)
(52) U.S. Cl. .......... 704/9; 704/1; 715/261; 715/257; 345/173
(58) Field of Classification Search .......... 704/1, 9; 715/261, 257; 345/173
See application file for complete search history.

(56) References Cited

U.S. PATENT DOCUMENTS

| | | | |
|---|---|---|---|
| 5,305,205 A | 4/1994 | Weber et al. | 364/419.1 |
| 5,736,974 A | 4/1998 | Selker | 345/146 |
| 5,748,512 A | 5/1998 | Vargas | 364/709.12 |
| 5,818,451 A | 10/1998 | Bertram et al. | 345/354 |
| 5,896,321 A | 4/1999 | Miller et al. | 365/189.01 |
| 6,040,824 A | 3/2000 | Maekawa et al. | 345/173 |
| 6,073,036 A | 6/2000 | Heikkinen et al. | 455/575 |
| 6,169,538 B1 | 1/2001 | Nowlan et al. | 345/168 |
| 6,259,436 B1 | 7/2001 | Moon et al. | 345/173 |
| 6,271,835 B1 | 8/2001 | Hoeksma | 345/168 |
| 6,307,548 B1 * | 10/2001 | Flinchem et al. | 715/811 |
| 6,469,722 B1 | 10/2002 | Kinoe et al. | 345/837 |
| 6,597,345 B2 | 7/2003 | Hirshberg | 345/168 |
| 6,714,221 B1 | 3/2004 | Christie et al. | 345/784 |
| 6,795,059 B2 | 9/2004 | Endo | 345/173 |
| 6,803,905 B1 | 10/2004 | Capps et al. | 345/173 |
| 6,857,800 B2 | 2/2005 | Zhang et al. | 400/473 |
| 7,038,659 B2 | 5/2006 | Rajkowski | 345/156 |
| 7,057,607 B2 | 6/2006 | Mayoraz et al. | 345/173 |
| 7,194,699 B2 | 3/2007 | Thomson et al. | 715/823 |

(Continued)

FOREIGN PATENT DOCUMENTS

WO    WO 98/33111    7/1998

(Continued)

OTHER PUBLICATIONS

CALL Centre 1999, "Word Prediction," Copyright (c) The CALL Centre & Scottish Executive Education Dept., pp. 63-73.

(Continued)

*Primary Examiner* — David R Hudspeth
*Assistant Examiner* — Lamont M Spooner
(74) *Attorney, Agent, or Firm* — Morgan, Lewis & Bockius LLP (57) ABSTRACT

Word recommendations are provided in response to text input. For a particular text input, possible word recommendations are identified based on the characters of the input and corresponding neighbor characters on a keyboard layout. The possible word recommendations are scored based on how closely they match the input word on a character-by-character basis, and a subset of the possible word recommendations are selected for presentation to the user.

15 Claims, 8 Drawing Sheets

U.S. PATENT DOCUMENTS

| | | | |
|---|---|---|---|
| 7,443,316 B2 | 10/2008 | Lim | 341/22 |
| 7,477,240 B2 | 1/2009 | Yanagisawa | 345/173 |
| 7,508,324 B2* | 3/2009 | Suraqui | 341/22 |
| 7,526,738 B2 | 4/2009 | Ording et al. | 715/862 |
| 7,679,534 B2* | 3/2010 | Kay et al. | 341/22 |
| 7,683,886 B2* | 3/2010 | Willey | 345/169 |
| 7,712,053 B2* | 5/2010 | Bradford et al. | 715/864 |
| 7,725,838 B2* | 5/2010 | Williams | 715/811 |
| 2002/0085037 A1 | 7/2002 | Leavitt et al. | 345/765 |
| 2002/0140679 A1 | 10/2002 | Wen | 345/168 |
| 2002/0191029 A1 | 12/2002 | Gillespie et al. | 345/810 |
| 2003/0090467 A1 | 5/2003 | Hohl et al. | 345/168 |
| 2003/0149978 A1 | 8/2003 | Plotnick | 725/39 |
| 2003/0193481 A1 | 10/2003 | Sokolsky | 345/173 |
| 2003/0197736 A1 | 10/2003 | Murphy | 345/780 |
| 2004/0070567 A1 | 4/2004 | Longe et al. | 345/156 |
| 2004/0135774 A1 | 7/2004 | La Monica | 345/174 |
| 2004/0160419 A1 | 8/2004 | Padgitt | 345/173 |
| 2004/0178994 A1 | 9/2004 | Kairls, Jr. | 345/173 |
| 2004/0183833 A1 | 9/2004 | Chua | 345/773 |
| 2004/0196256 A1 | 10/2004 | Wobbrock et al. | 345/156 |
| 2005/0024341 A1 | 2/2005 | Gillespie et al. | 345/173 |
| 2005/0190970 A1 | 9/2005 | Griffin | 382/209 |
| 2005/0216331 A1 | 9/2005 | Ahrens et al. | 705/11 |
| 2005/0278647 A1 | 12/2005 | Leavitt et al. | 715/765 |
| 2006/0152496 A1 | 7/2006 | Knaven | 345/172 |
| 2006/0206454 A1 | 9/2006 | Forstall et al. | 707/3 |
| 2006/0246955 A1 | 11/2006 | Nirhamo et al. | 455/566 |
| 2006/0265648 A1 | 11/2006 | Rainisto et al. | 715/534 |
| 2006/0274051 A1* | 12/2006 | Longe et al. | 345/173 |
| 2007/0040813 A1 | 2/2007 | Kushler et al. | 345/173 |
| 2007/0061754 A1 | 3/2007 | Ardhanari et al. | 715/816 |
| 2007/0067272 A1 | 3/2007 | Flynt et al. | 707/3 |
| 2007/0130128 A1* | 6/2007 | Garg et al. | 707/3 |
| 2007/0152978 A1 | 7/2007 | Kocienda et al. | 345/173 |
| 2008/0059876 A1* | 3/2008 | Hantler et al. | 715/257 |
| 2009/0327977 A1 | 12/2009 | Bachfischer et al. | 715/863 |

FOREIGN PATENT DOCUMENTS

| | | |
|---|---|---|
| WO | WO 00/38041 | 6/2000 |

OTHER PUBLICATIONS

Dyslexic.com, "AlphaSmart 3000 with CoWriter SmartApplet: Don Johnston Special Needs," http://www.dyslexic.com/procuts. php?catid=2&pid=465&PHPSESSID=2511b800000f7da..., downloaded Dec. 6, 2005, 13 pages.

Glossary of Adaptive Technologies: Word Prediction, http://www.utoronto.ca/atrc/reference/techwordpred.html, printed Dec. 6, 2005, 5 pages.

MacTech, "KeyStrokes 3.5 for Mac OS X Boosts Word Prediction," http://www.mactech.com/news/?p=1007129, printed Jan. 7, 2008, 3 pages.

Mobile Tech News, "T9 Text Input Software Updated," htpp://www.mobiletechnews.com/info/2004/11/23/122155.html, Nov. 23, 2004, 4 pages.

NCIP: Word Prediction Collection, "What is Word Prediction?" http://www2.edc.org/NCIP/library/wp/What_is.htm, printed Jan. 7, 2008, 2 pages.

NCIP: Word Prediction Collection, NCIP Library: Word Prediction Collection, http://www2.edc.org/NCIP/library/wp/toc.htm, printed Jan. 7, 2008, 4 pages.

International Search Report and Written Opinion for International Application PCT/US2007/088872, mailed May 8, 2008.

International Search Report and Written Opinion for International Application PCT/US2007/088873, mailed May 8, 2008.

Office Action dated Apr. 10, 2009, for U.S. Appl. No. 11/549,624.

Office Action dated May 22, 2009, for U.S. Appl. No. 11/459,615.

Office Action dated May 28, 2009, for U.S. Appl. No. 11/459,606.

Office Action dated Jul. 22, 2009, for U.S. Appl. No. 11/549,624.

Final Office Action dated Feb. 1, 2010, in U.S. Appl. No. 11/549,624.

Office Action dated May 26, 2010, in European Application No. 07 869 922.0, which corresponds to U.S. Appl. No. 11/620,641.

Office Action dated Mar. 30, 2010, in U.S. Appl. No. 11/620,642.

Office Action dated May 26, 2010, in European Application No. 07 869 923.8, which corresponds to U.S. Appl. No. 11/620,642.

Notice of Allowance dated Jun. 3, 2010, in U.S. Appl. No. 11/549,624.

Office Action dated Apr. 1, 2010, in Australian Patent Application No. 2007342164, which corresponds to U.S. Appl. No. 11/620,641.

Office Action dated Nov. 25, 2010, in Chinese Patent Application No. 200780052020.1, which corresponds to U.S. Appl. No. 11/620,641.

Office Action dated Dec. 7, 2010, in European Patent Application No. 07 869 922.0, which corresponds to U.S. Appl. No. 11/620,641.

Final Office Action dated Nov. 29, 2010, in U.S. Appl. No. 11/620,642.

Office Action dated Feb. 18, 2011, in U.S. Appl. No. 11/620,642.

* cited by examiner

| | | | | | | | | |
|---|---|---|---|---|---|---|---|---|
| Input: | r | h | e | a | t | r | e | |
| Candidate Word: | t | h | e | a | t | e | r | |
| Score: | 0.5N | N | N | N | N | 0.5N | 0.5N | = 5.5N |
| Candidate Word: | t | h | r | e | a | t | s | |
| Score: | 0.5N | N | 0.5N | 0.25N | 0.25N | 0.5N | 0.5N | = 3.5N |
| Candidate Word: | t | h | e | r | e | | | |
| Score: | 0.5N | N | N | 0.25N | 0.25N | 0 | 0 | = 3N |

FIG. 7A

| Input: | t | h | a | e | t | e | r | |
|---|---|---|---|---|---|---|---|---|
| Candidate Word: | t | h | e | a | t | e | r | |
| Score: | N | N | 0.25N | 0.25N | N | N | N | = 5.5N |
| Plus bonus for difference in 1 set of transposed characters: | | | P | | | | | = 5.5N + P |

FIG. 7B

| Input: | t | h | e | s | t | e | r | |
|---|---|---|---|---|---|---|---|---|
| Candidate Word: | t | h | e | a | t | e | r | |
| Score: | N | N | N | 0.5N | N | N | N | = 6.5N |
| Plus bonus for difference in only 1 character: | | | | Q | | | | = 6.5N + Q |

FIG. 7C

METHOD AND SYSTEM FOR PROVIDING WORD RECOMMENDATIONS FOR TEXT INPUT

RELATED APPLICATIONS

This application is related to U.S. patent application Ser. No. 11/620,642, filed Jan. 5, 2007, entitled "Method, System, and Graphical User Interface for Providing Word Recommendations", the content of which is hereby incorporated by reference in its entirety.

TECHNICAL FIELD

The disclosed embodiments relate generally to text input on portable communication devices, and more particularly, to methods and systems for providing word recommendations in response to text input.

BACKGROUND

In recent years, the functional capabilities of portable communications devices have increased dramatically. Current devices enable communication by voice, text, and still or moving images. Communication by text, such as by email, instant message (IM) or short messaging service (SMS), has proven to be quite popular.

However, the size of these portable communication devices also restricts the size of the text input device, such as a physical or virtual keyboard, in the portable device. With a size-restricted keyboard, designers are often forced to make the keys smaller or overload the keys. Both may lead to typing mistakes and thus more backtracking to correct the mistakes. This makes the process of communication by text on the devices inefficient and reduces user satisfaction with such portable communication devices.

Accordingly, there is a need for more efficient ways of entering text into portable devices.

SUMMARY

In accordance with some embodiments, a computer-implemented method involves receiving a sequence of input characters from a keyboard, wherein the keyboard has a predefined layout of characters with each character in the layout having one or more neighbor characters. The method also involves generating a set of strings from at least a subset of the sequence of input characters, where the set of strings comprises permutations of respective input characters in the subset of the sequence and neighbor characters of the respective input characters on the layout of the keyboard; identifying in a dictionary one or more candidate words that have a string in the set of strings as a prefix; scoring the candidate words; selecting a subset of the candidate words based on predefined criteria; and presenting the subset of the candidate words.

In accordance with some embodiments, there is a computer program product for use in conjunction with a portable communications device. The computer program product comprises a computer readable storage medium and a computer program mechanism embedded therein. The computer program mechanism includes instructions for receiving a sequence of input characters from a keyboard, wherein the keyboard has a predefined layout of characters with each character in the layout having one or more neighbor characters; instructions for generating a set of strings from at least a subset of the sequence of input characters, the set of strings comprising permutations of respective input characters in the subset of the sequence and neighbor characters of the respective input characters on the layout of the keyboard; instructions for identifying in a dictionary one or more candidate words, each candidate word having a string in the set of strings as a prefix; instructions for scoring the candidate words; instructions for selecting a subset of the candidate words based on predefined criteria; and instructions for presenting the subset of the candidate words.

In accordance with some embodiments, a portable communications device includes a display; a keyboard, the keyboard having a predefined layout of characters with each character in the layout having one or more neighbor characters; one or more processors; memory; and a program stored in the memory and configured to be executed by the one or more processors. The program includes instructions for receiving a sequence of input characters from the keyboard; instructions for generating a set of strings from at least a subset of the sequence of input characters, the set of strings comprising permutations of respective input characters in the subset of the sequence and neighbor characters of the respective input characters on the layout of the keyboard; instructions for identifying in a dictionary one or more candidate words, each candidate word having a string in the set of strings as a prefix; instructions for scoring the candidate words; instructions for selecting a subset of the candidate words based on predefined criteria; and instructions for presenting the subset of the candidate words.

In accordance with some embodiments, a portable communications device includes display means; input means having a predefined layout of characters, each character in the layout having one or more neighbor characters; one or more processor means; memory means; and a program mechanism stored in the memory means and configured to be executed by the one or more processors means. The program mechanism includes instructions for receiving a sequence of input characters from the input means; instructions for generating a set of strings from at least a subset of the sequence of input characters, the set of strings comprising permutations of respective input characters in the subset of the sequence and neighbor characters of the respective input characters on the layout of the input means; instructions for identifying in a dictionary one or more candidate words, each candidate word having a string in the set of strings as a prefix; instructions for scoring the candidate words; instructions for selecting a subset of the candidate words based on predefined criteria; and instructions for presenting the subset of the candidate words.

In accordance with some embodiments, a computer-implemented method involves receiving a sequence of individual touch points input by a user that form a user-input directed graph; comparing the user-input directed graph to respective directed graphs for words in a dictionary; generating a list of candidate words based at least in part on the comparing step; and presenting at least some of the candidate words to the user.

In accordance with some embodiments, there is a computer program product for use in conjunction with a portable communications device. The computer program product comprises a computer readable storage medium and a computer program mechanism embedded therein. The computer program mechanism includes instructions for receiving a sequence of individual touch points input by a user that form a user-input directed graph; instructions for comparing the user-input directed graph to respective directed graphs for words in a dictionary; instructions for generating a list of candidate words based at least in part on the comparing step; and instructions for presenting at least some of the candidate words to the user.

In accordance with some embodiments, a portable communications device includes a display; a keyboard; one or more processors; memory; and a program stored in the memory and configured to be executed by the one or more processors. The program includes instructions for receiving a sequence of individual touch points input by a user that form a user-input directed graph; instructions for comparing the user-input directed graph to respective directed graphs for words in a dictionary; instructions for generating a list of candidate words based at least in part on the comparing step; and instructions for presenting at least some of the candidate words to the user.

In accordance with some embodiments, a portable communications device includes means for receiving a sequence of individual touch points input by a user that form a user-input directed graph; means for comparing the user-input directed graph to respective directed graphs for words in a dictionary; means for generating a list of candidate words based at least in part on the comparing step; and means for presenting at least some of the candidate words to the user.

Thus, the embodiments provide more efficient ways to enter text in a portable device.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

A portable communication device includes a user interface and a text input device. Via the interface and the text input device, a user may enter text into the device. The text includes words, which are sequences of characters separated by whitespaces or particular punctuation. For a word as it is being entered or an entered word, the device identifies and offers word recommendations that may be selected by the user to replace the word as inputted by the user.

Figure 1:
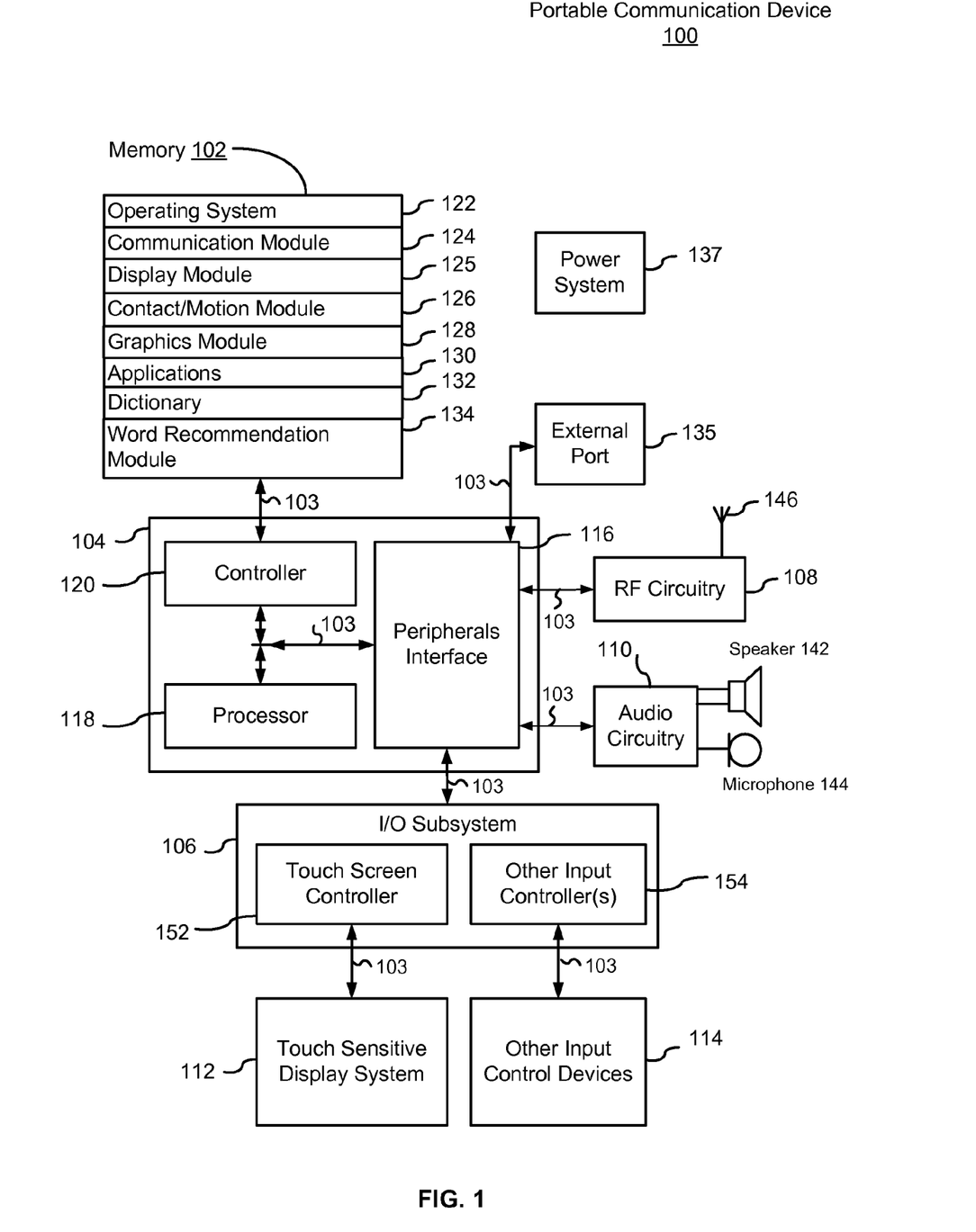
FIG. 1 is a block diagram illustrating a portable communications device in accordance with some embodiments.

Attention is now directed to an embodiment of a portable communications device. FIG. 1 is a block diagram illustrating an embodiment of a device 100, such as a portable electronic device having a touch-sensitive display 112. The device 100 may include a memory controller 120, one or more data processors, image processors and/or central processing units 118 and a peripherals interface 116. The memory controller 120, the one or more processors 118 and/or the peripherals interface 116 may be separate components or may be integrated, such as in one or more integrated circuits 104. The various components in the device 100 may be coupled by one or more communication buses or signal lines 103.

The peripherals interface 116 may be coupled to an optical sensor (not shown), such as a CMOS or CCD image sensor; RF circuitry 108; audio circuitry 110; and/or an input/output (I/O) subsystem 106. The audio circuitry 110 may be coupled to a speaker 142 and a micro-phone 144. The device 100 may support voice recognition and/or voice replication. The RF circuitry 108 may be coupled to one or more antennas 146 and may allow communication with one or more additional devices, computers and/or servers using a wireless network. The device 100 may support a variety of communications protocols, including code division multiple access (CDMA), Global System for Mobile Communications (GSM), Enhanced Data GSM Environment (EDGE), Wi-Fi (such as IEEE 802.11a, IEEE 802.11b, IEEE 802.11g and/or IEEE 802.11n), Bluetooth, Wi-MAX, a protocol for email, instant messaging, and/or a short message service (SMS), or any other suitable communication protocol, including communication protocols not yet developed as of the filing date of this document. In an exemplary embodiment, the device 100 may be, at least in part, a cellular telephone.

The I/O subsystem 106 may include a touch screen controller 152 and/or other input controller(s) 154. The touch-screen controller 152 may be coupled to a touch-sensitive screen or touch sensitive display system 112.

The touch-sensitive display system 112 provides an input interface and an output interface between the device and a user. The display controller 152 receives and/or sends electrical signals from/to the display system 112. The display system 112 displays visual output to the user. The visual output may include graphics, text, icons, video, and any combination thereof (collectively termed "graphics"). In some embodiments, some or all of the visual output may correspond to user-interface objects, further details of which are described below.

A touch screen in display system 112 is a touch-sensitive surface that accepts input from the user based on haptic and/or tactile contact. The display system 112 and the display controller 152 (along with any associated modules and/or sets of instructions in memory 102) detect contact (and any movement or breaking of the contact) on the display system 112 and converts the detected contact into interaction with user-interface objects (e.g., one or more soft keys, icons, web pages or images) that are displayed on the touch screen. The touch screen 112 may be used to implement virtual or soft buttons and/or a keyboard. In an exemplary embodiment, a point of contact between a touch screen in the display system 112 and the user corresponds to a finger of the user.

The touch screen in the display system 112 may use LCD (liquid crystal display) technology, or LPD (light emitting polymer display) technology, although other display technologies may be used in other embodiments. The touch screen in the display system 112 and the display controller 152 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen in the display system 112. A touch-sensitive display in some embodiments of the display system 112 may be analogous to the multi-touch sensitive tablets described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference. However, a touch screen in the display system 112 displays visual output from the portable device 100, whereas touch sensitive tablets do not provide visual output. The touch screen in the display system 112 may have a resolution in excess of 100 dpi. In an exemplary embodiment, the touch screen in the display system has a resolution of approximately 168 dpi. The user may make contact with the touch screen in the display system 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

A touch-sensitive display in some embodiments of the display system 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein.

The other input controller(s) 154 may be coupled to other input/control devices 114, such as one or more buttons, a keyboard, infrared port, USB port, and/or a pointer device such as a mouse. The one or more buttons (not shown) may include an up/down button for volume control of the speaker 142 and/or the micro-phone 144. The one or more buttons (not shown) may include a push button. A quick press of the push button (not shown) may engage or disengage a lock of the touch screen 112. A longer press of the push button (not shown) may turn power to the device 100 on or off. The user may be able to customize a functionality of one or more of the buttons.

In some embodiments, the device 100 may include circuitry for supporting a location determining capability, such as that provided by the global positioning system (GPS). In some embodiments, the device 100 may be used to play back recorded music stored in one or more files, such as MP3 files or AAC files. In some embodiments, the device 100 may include the functionality of an MP3 player, such as an iPod (trademark of Apple Computer, Inc.). In some embodiments, the external port is a multi-pin (e.g., 30-pin) connector that is the same as, or similar to and/or compatible with the 30-pin connector used on iPod devices.

The device 100 also includes a power system 137 for powering the various components. The power system 137 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices. The device 100 may also include one or more external ports 135 for connecting the device 100 to other devices.

The memory controller 120 may be coupled to memory 102 with one or more types of computer readable media. Memory 102 may include high-speed random access memory and/or non-volatile memory, such as one or more magnetic disk storage devices, one or more optical storage devices, and/or flash memory. Memory 102 may store an operating system 122, such as Darwin, RTXC, LINUX, UNIX, OS X, WINDOWS, or an embedded operating system such as VxWorks. The operating system 122 may include procedures (or sets of instructions) for handling basic system services and for performing hardware dependent tasks. Memory 102 may also store communication procedures (or sets of instructions) in a communication module 124. The communication procedures may be used for communicating with one or more additional devices, one or more computers and/or one or more servers. Memory 102 may include a display module (or a set of instructions) 125, a contact/motion module (or a set of instructions) 126 to determine one or more points of contact and/or their movement, and a graphics module (or a set of instructions) 128. The graphics module 128 may support widgets, that is, modules or applications with embedded graphics. The widgets may be implemented using JavaScript, HTML, or other suitable languages.

Memory 102 may also include one or more applications 130. Examples of applications include email applications, text messaging or instant messaging applications, web browsers, memo pad applications, address books or contact lists, and calendars.

Also in memory 102 are one or more dictionaries 132 and a word recommendation module (or set of instructions) 134. In some embodiments, a dictionary contains a list of words and corresponding usage frequency rankings. The usage frequency ranking of a word is the statistical usage frequency for that word in a language, or by a predefined group or people, or by the user of the device 100, or a combination thereof. As described below, a dictionary may include multiple usage frequency rankings for regional variations of the same language and/or be tailored to a user's own usage frequency, e.g., derived from the user's prior emails, text messages, and other previous input from the user. The word recommendation module identifies word recommendations for presentation to the user in response to text input by the user.

Each of the above identified modules and applications corresponds to a set of instructions for performing one or more functions described above. These modules (i.e., sets of instructions) need not be implemented as separate software programs, procedures or modules. The various modules and sub-modules may be rearranged and/or combined. Memory 102 may include additional modules and/or sub-modules, or fewer modules and/or sub-modules. Memory 102, therefore, may include a subset or a superset of the above identified modules and/or sub-modules. Various functions of the device 100 may be implemented in hardware and/or in software, including in one or more signal processing and/or application specific integrated circuits.

Figure 2:
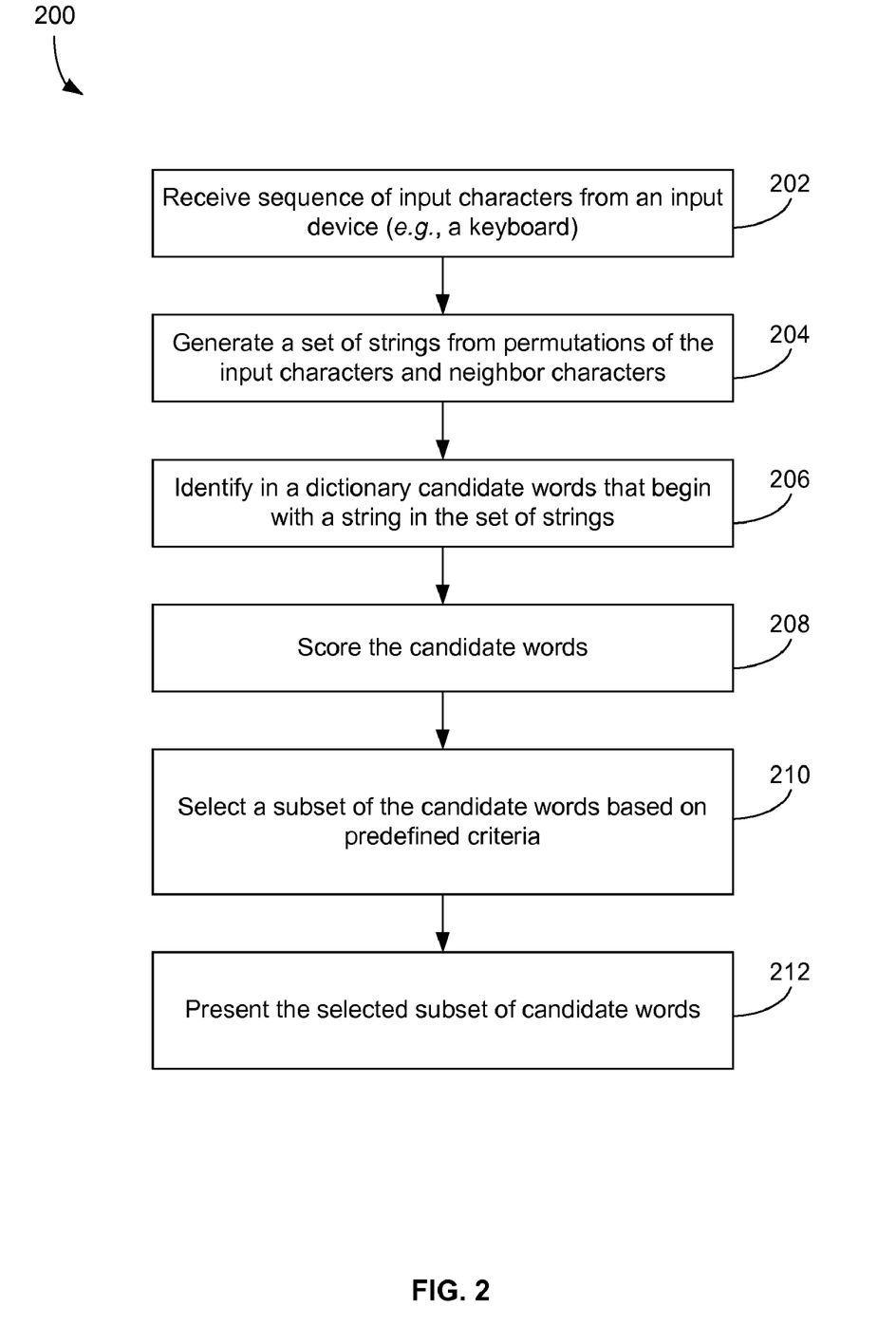
FIG. 2 is a flow diagram illustrating a process of providing word recommendations in accordance with some embodiments.

Attention is now directed to FIG. 2, a flow diagram illustrating a process of providing word recommendations in accordance with some embodiments. Process flow 200 describes a process of providing word recommendations in response to input of a character string by a user.

A sequence of input characters is received from an input device (202). A user inputs a sequence of characters into the portable communications device via an input device, such as a keyboard, and the device receives the input. As used herein, the input character sequence is a sequence of non-whitespace characters, delimited by whitespaces or punctuation, input by the user via the input device. The sequence of characters may constitute a word.

In some embodiments, the input device is a virtual keyboard (also called a soft keyboard) displayed on a touch-sensitive display of the portable device, where the user hits the keys of the keyboard ("types on the keyboard") by touching the touch-sensitive display on locations corresponding to keys of the virtual keyboard. In some other embodiments, the input device is a physical keyboard on the device (also called a hard keyboard).

The keyboard, whether virtual or physical, has a plurality of keys, each key corresponding to one or more characters, such as letters, numbers, punctuation, or symbols. The keys are arranged in accordance with a predefined layout that defines the positions of the keys on the keyboard. On the layout, each key has at least one neighbor key. In some embodiments, the keyboard layout follows the well-known QWERTY layout or a variant thereof. In some other embodiments, the keyboard layout may follow other layouts. Furthermore, in some embodiments, the layout may change depending on the language used on the device. For example, if English is selected as the user interface language, then the active keyboard layout may be the QWERTY layout, and other layouts may be active when another language, such as Swedish or French, is selected as the user interface language. Further details regarding keyboard layouts are described below in relation to FIG. 5.

Permutations of input characters and neighbor characters are determined and a set of strings are generated from the permutations (204). As used herein, a "permutation" is a sequence of characters, wherein each character in the sequence is either the input character in the corresponding position in the input character sequence or a neighbor character of that input character on the keyboard layout. The first character in the permutation is the first character of the input character sequence or a neighbor of that first character on the keyboard layout, the second character in the permutation is the second character of the input character sequence or a neighbor of that second character on the keyboard layout, and so forth, up to and perhaps including the last character in the input character sequence. Thus, the length of a permutation and of a generated string is at most the length of the input character sequence.

For example, if the input sequence is "rheater," then the first character in any of the permutations generated for this input sequence is "r" (the first character in the input sequence) or any characters that are neighbors to "r" on the keyboard layout. The second character in a permutation is "h" or any neighbor thereof. The third character in a permutation is "e" (the third character in the input sequence) or neighbors thereof, and so forth.

In some embodiments, permutations may be determined for a predefined-length subset of the input sequence and strings of the same predefined length may be generated from the permutations. In some embodiments, the predefined length is 3 characters. That is, the permutations are determined and prefix strings are generated from the first three characters in the input sequence and neighbors thereof. If the length of the input sequence is less than the predefined length, a process other than process flow 200 may be used to provide word recommendations. For example, if the input sequence is one or two characters long, the input sequence in its entirety may be compared against words in a dictionary and best matches are identified.

The set of strings are compared against a dictionary. Words in the dictionary that have any of the set of strings as a prefix are identified (206). As used herein, "prefix" means that the string is a prefix of a word in the dictionary or is itself a word in the dictionary. A dictionary, as used herein, refers to a list of words. The dictionary may be pre-made and stored in the memory. The dictionary may also include usage frequency rankings for each word in the dictionary. A usage frequency ranking for a word indicates (or more generally, corresponds to) the statistical usage frequency for that word in a language. In some embodiments, the dictionary may include different usage frequency rankings for different variants of a language. For example, a dictionary of words in the English language may have different usage frequency rankings with respect to American English and British English.

In some embodiments, the dictionary may be customizable. That is, additional words may be added to the dictionary by the user. Furthermore, in some embodiments, different applications may have different dictionaries with different words and usage frequency rankings. For example, an email application and an SMS application may have different dictionaries, with different words and perhaps different usage frequency rankings within the same language.

The identified words are the candidate words that may be presented to the user as recommended replacements for the input sequence. The candidate words are scored (208). Each candidate word is scored based on a character-to-character comparison with the input sequence and optionally other factors. Further details regarding the scoring of candidate words are described below, in relation to FIGS. 3 and 7A-7C. A subset of the candidate words are selected based on predefined criteria (210) and the selected subset is presented to the user (212). In some embodiments, the selected candidate words are presented to the user as a horizontal listing of words.

Figure 3:
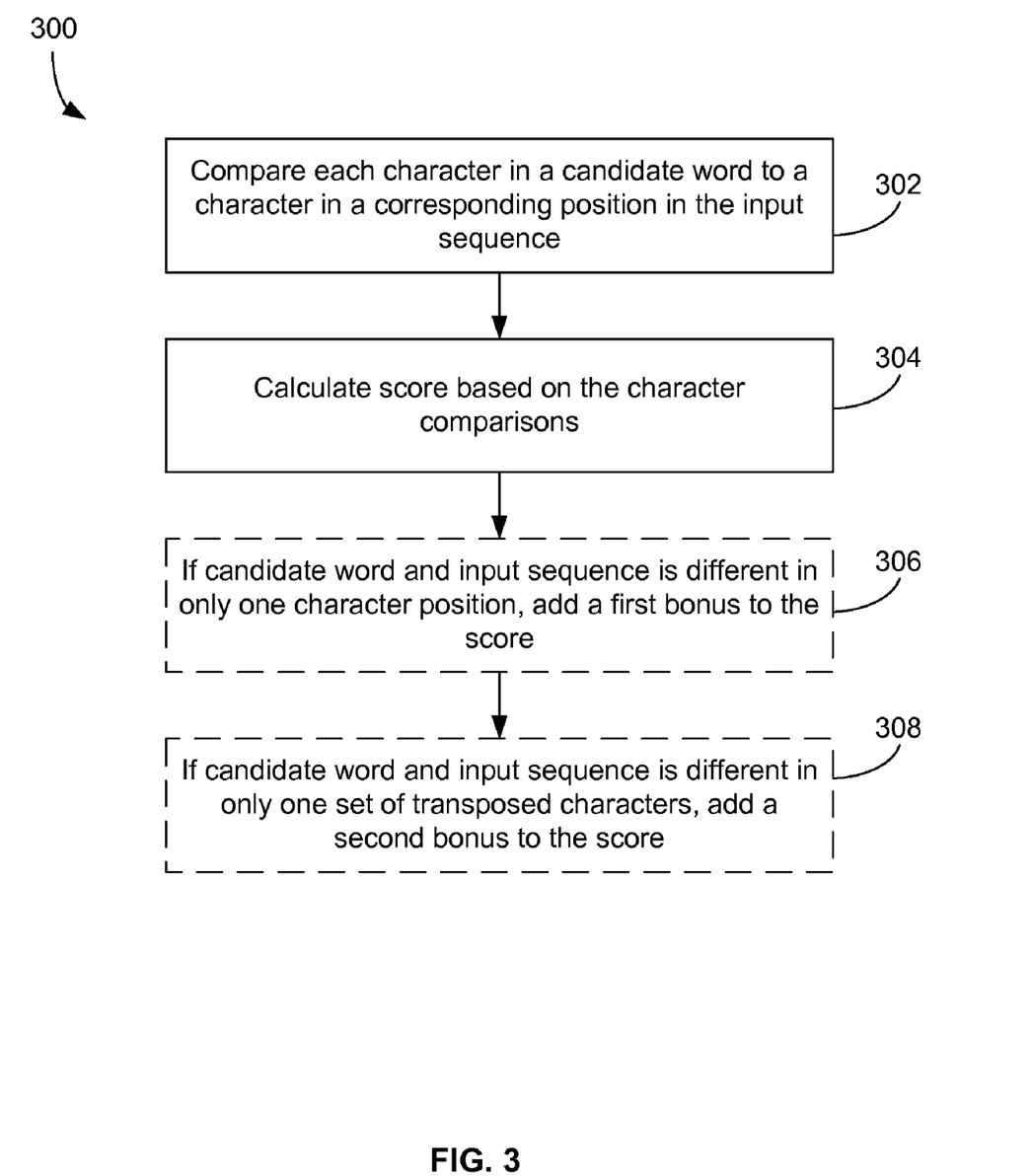
FIG. 3 is a flow diagram illustrating a process of scoring candidate words in accordance with some embodiments.

Attention is now directed to FIG. 3, a flow diagram illustrating a process of scoring candidate words in accordance with some embodiments. Process flow 300 describes a process of scoring a candidate word. The scoring helps determine which word(s) in the dictionary is/are the best potential replacement(s) for the input sequence of characters.

Each character in a candidate word is compared to the character in the corresponding position in the input sequence (302). Thus, the first character in the candidate word is compared to the first character in the input sequence, the second character in the candidate word is compared to the second character in the input sequence, and so forth. If either the candidate word or the input sequence is longer than the other, then the additional characters beyond the shorter length of the two are ignored in the comparison. In some embodiments, further comparison of the candidate word with the input sequence may be made. For example, the further comparison may include determining the number of character differences between the candidate words and the input sequence, and determining if any character differences are a result of transposed characters. A score is calculated for the candidate word based on the comparison described above (304). Each character comparison yields a value, and the values are added to yield the score for the candidate word.

In some embodiments, the score value given for a character comparison is based on the actual characters as opposed to merely whether the characters match. More particularly, the value may be based on whether the character in the candidate word matches the corresponding character in the input sequence exactly and/or whether the character in the candidate word is a keyboard layout neighbor of the corresponding character in the input sequence.

Optionally, a first "bonus" may be added to the score of the candidate word if the candidate word and the input sequence are different in only one character (306). Similarly, an optional second "bonus" may be added to the score of the candidate word if the candidate word and the input sequence are different in only a pair of transposed adjacent characters (308). Further details regarding candidate word scoring is described below, in relation to FIGS. 7A-7C.

Figure 4:
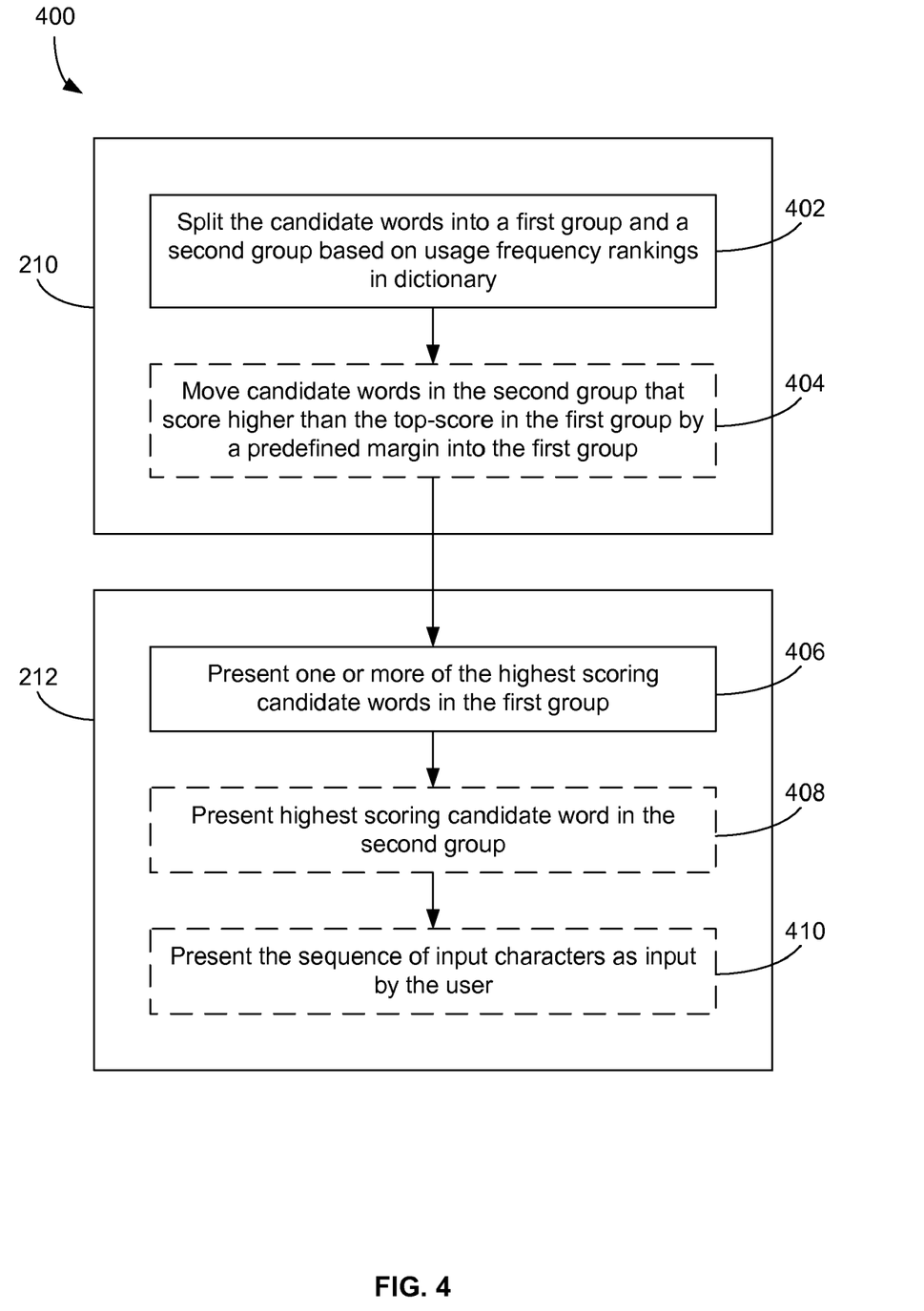
FIG. 4 is a flow diagram illustrating a process of selecting and presenting candidate words in accordance with some embodiments.

Attention is now directed to FIG. 4, a flow diagram illustrating a process of selecting and presenting candidate words in accordance with some embodiments. Process flow 400 describes in further details blocks 210 and 212 (FIG. 2), which involves selection and presentation of candidate words.

The candidate words are split into two groups based on their usage frequency rankings within the dictionary (402). A first group includes the candidate words whose usage frequency rankings exceeds a predefined threshold. The second group includes the candidate words whose usage frequency rankings does not exceed the threshold. With each of the two groups, the candidate words are sorted by their candidate word scores.

There may be candidate words in the second group whose scores are very high because, for example, they match the input sequence exactly or almost exactly. In some embodiments, these high-scoring words may be removed from the second group and added to the first group if their scores exceed the score of the highest scoring candidate word in the first group by a predefined margin (404). In some embodiments, the predefined margin is that the score of the candidate word in the second group must be at least two times the highest candidate word score in the first group.

One or more of the highest scoring candidate words in the first group are presented to the user (406). It should be appreciated that if candidate words from the second group were moved to the first group as described above, then the candidate words that are presented will include at least one candidate word that was originally in the second group since that candidate word has a higher score than any of the original candidate words in the first group.

In some embodiments, if block 404 is not performed, either because no candidate word in the second group satisfies the score margin threshold or because the moving of candidate words is not performed at all, the highest scoring candidate word in the second group may nevertheless be presented along with the candidate words from the first group (408). Furthermore, in some embodiments, the input sequence as entered by the user may be presented as a matter of course (410). The user may choose any one of the presented candidate words to replace the input sequence, including choosing the input sequence as entered if the user is satisfied with it.

Figure 5A:
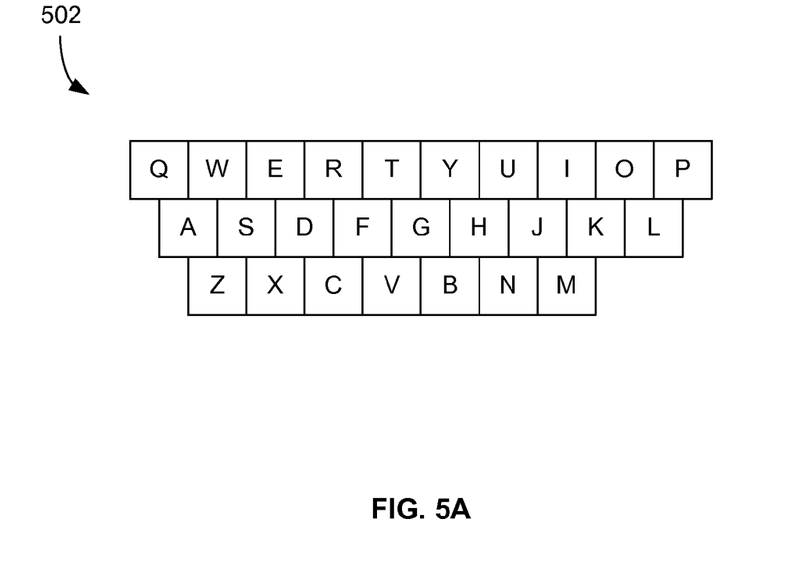
FIGS. 5A and 5B illustrate exemplary layouts of letter keys on a keyboard in accordance with some embodiments.
Figure 5B:
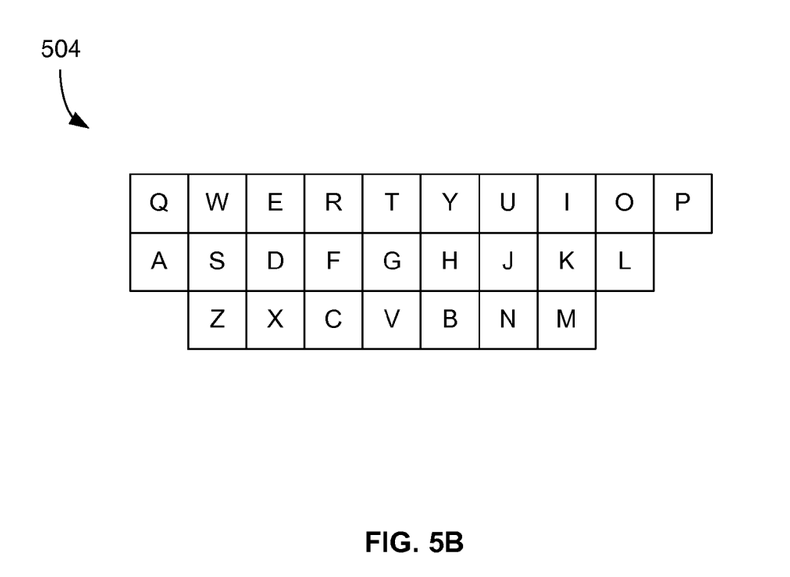

Attention is now directed to FIGS. 5A and 5B, which are exemplary layouts of letter keys on a keyboard in accordance with some embodiments. As described above, the prefix strings, based on which candidate words are identified, are generated based on characters in the input sequence and their corresponding neighbor characters on a keyboard layout. Keyboard layouts 502 and 504 are exemplary keyboard layouts. A keyboard layout defines the positions of each key on the keyboard and the alignment of the keys relative to each other. For ease of description, only the letter keys of the layouts 502 and 504 are shown. It should be appreciated, however, that a keyboard layout may also include keys for numbers, punctuation, symbols, and functional keys. In some embodiments, some keys may be overloaded, that is, a key may correspond to multiple characters and/or functions.

Layouts 502 and 504 are layouts that follow the well-known QWERTY layout. However, the key alignment in layout 502 is different from the key alignment in layout 504. In layout 502, the keys are aligned in rows but not in columns; a key in one row may straddle two keys in an adjacent row. For example, key "T" straddles keys "F" and "G" in layout 502. In layout 504, the keys are aligned in columns as well as in rows. The definition of which keys are the neighbors of a key may be different depending on how the keys are aligned. In layout 502, the neighbors of a particular key may be defined as the keys that are directly adjacent to the particular key or whose peripheries "touch" a periphery of the particular key. For example, the neighbors of key "G" in layout 502 are keys "T," "Y," "F," "H," "V," and "B;" and the neighbors of key "W" are keys "Q," "E," "A," and "S," In layout 504, the neighbors of a particular key may be defined as the keys that are immediately above, below, to the side of, and diagonal of the particular key. For example, the neighbors of key "G" in layout 504 are keys "R," "T," "Y," "F," "H," "C," "V," and "B;" and the neighbors of key "W" are keys "Q," "E," "A," "S," and "D."

It should be appreciated, however, that layouts 502 and 504 are merely exemplary, and that other layouts and key alignments are possible and the same key may have different neighbors in different layouts.

Figure 6:
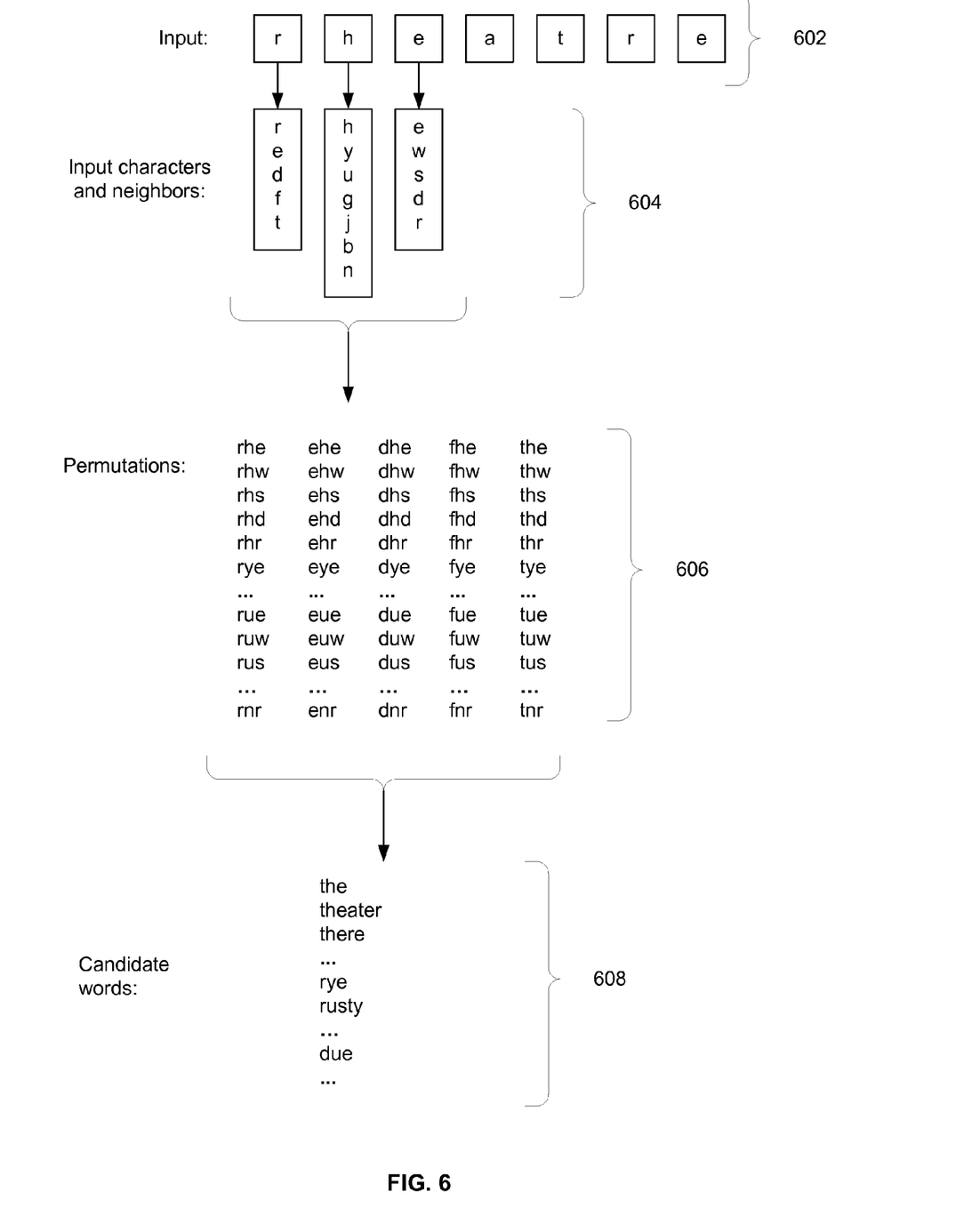
FIG. 6 illustrates an exemplary derivation of candidate words based on a text input in accordance with some embodiments.

Attention is now directed to FIG. 6, an exemplary derivation of candidate words based on a text input in accordance with some embodiments. FIG. 6 illustrates an example of the identification of candidate words from an input sequence.

In FIG. 6, the input sequence 602 is "rheatre." For prefix strings of three characters in length, the first three characters and their corresponding neighbors 604 are identified. Here, the first character is "r" and its neighbors, in accordance with the layout 502, are "e," "d," "f," and "t." The second character is "h," and its neighbors are "y," "u," "g," "j," "b," and "n." The third character is "e," and its neighbors are "w," and "s," "d," and "r."

From the input characters and corresponding neighbors, the character permutations 606 are determined. Each permutation is a character combination where the first character is the first input character or a neighbor thereof, the second character is the second input character or a neighbor thereof, and the third character is the third input character or a neighbor thereof. From these permutations, prefix strings are generated and compared to words in the dictionary. Examples of three-character permutations based on the input sequence 602 include "the," "rus," "rye," and "due." Words in the dictionary that have one of these strings as a prefix are identified as candidate words 608. Examples of candidate words include "theater," "rye," "rusty," "due," "the," and "there." In other embodiments, the character permutations may include four, five, or more characters, rather than three characters.

Figure 7A:
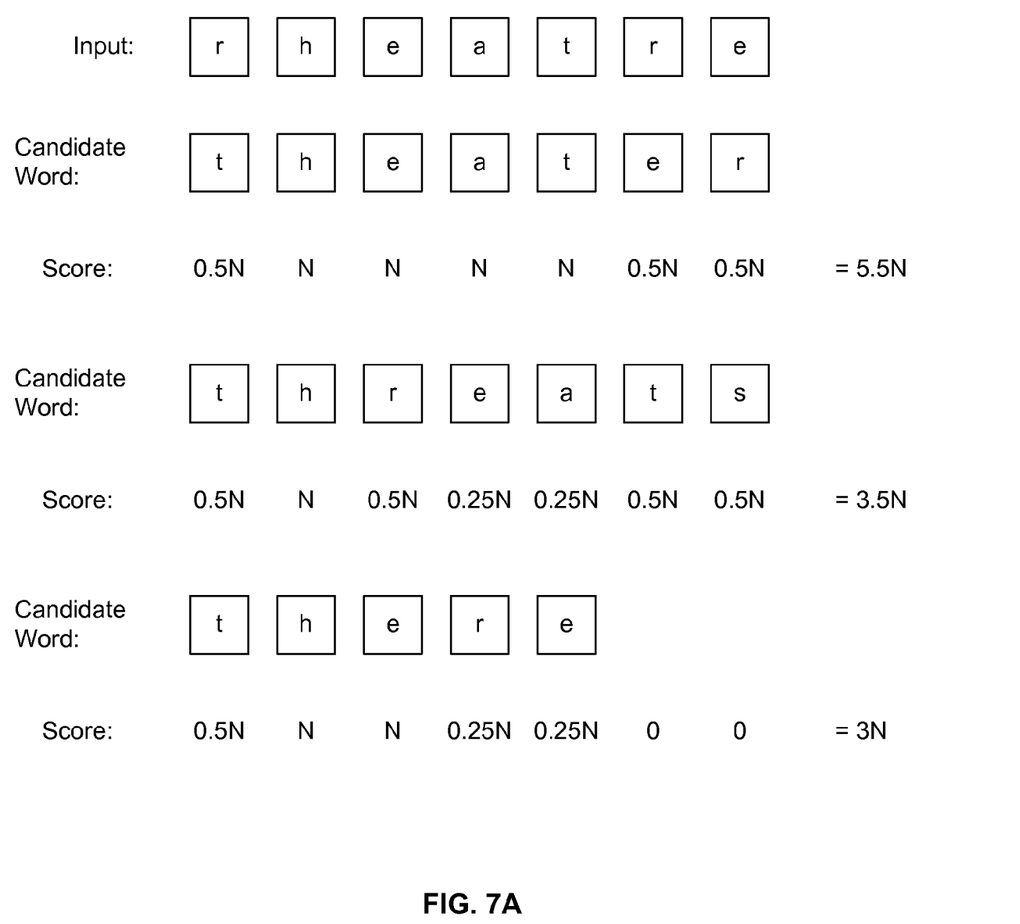
FIGS. 7A-7C illustrate examples of scoring of candidate words in accordance with some embodiments.
Figure 7B:
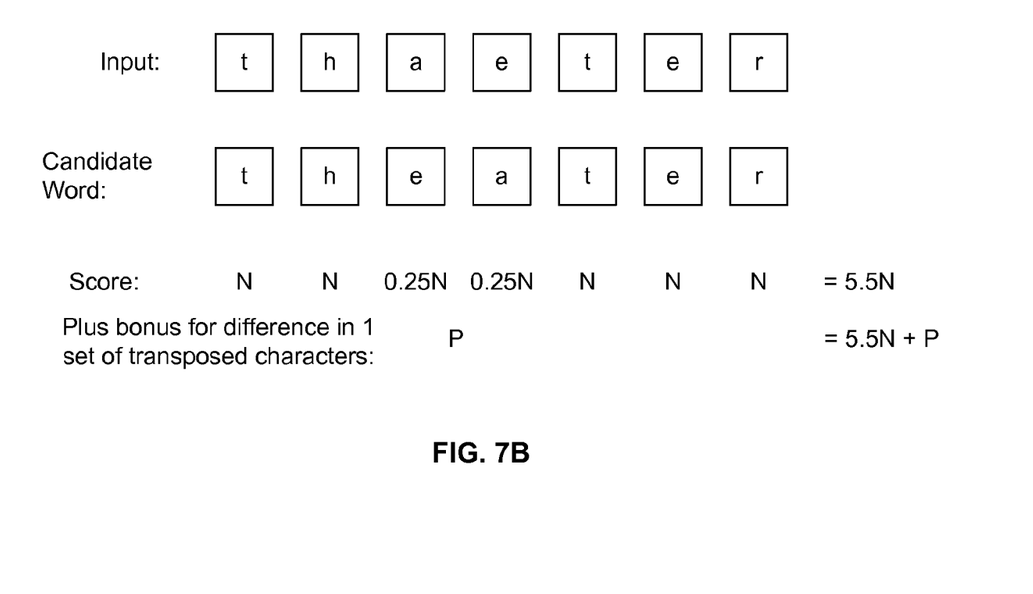
Figure 7C:
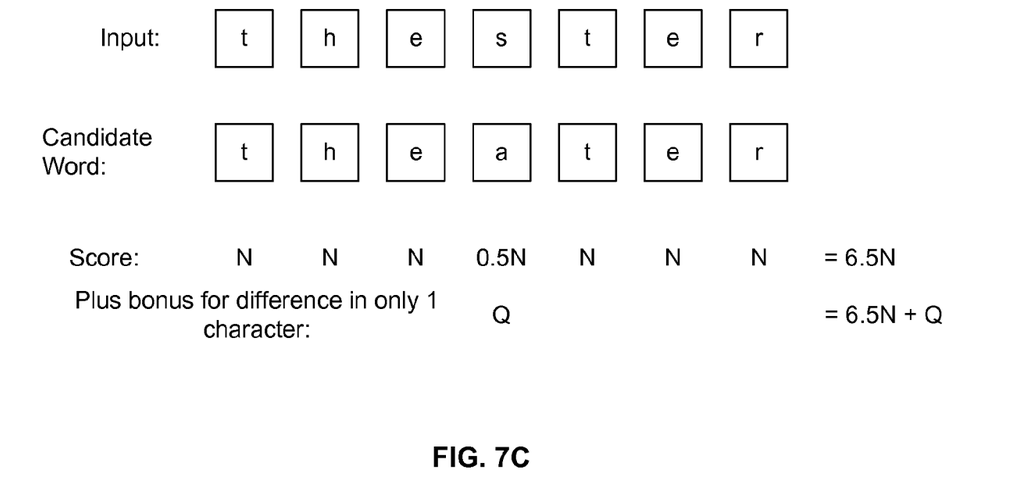

Attention is now directed to FIGS. 7A-7C, which are examples of scoring of candidate words in accordance with some embodiments. FIG. 7A shows an input sequence and three possible candidate words that may be identified from permutations of the first three characters of the input sequence. The candidate words are compared to the input sequence character-by-character and scores for the candidate words are tallied.

In some embodiments, a score tally of a candidate word involves assigning a value for each character comparison and adding the values together. The value that is assigned for a character comparison is based on the result of the comparison. Particularly, the value is based on whether the character in the candidate word, compared to the character in the corresponding position in the input sequence, is an exact match, a neighbor on the keyboard layout, or neither. In some embodiments, the value assigned for an exact match is a predefined value N. If the characters are not an exact match but are neighbors, then the value assigned is a value $\alpha N$, where $\alpha$ is a constant and $\alpha<1$. In some embodiments, $\alpha$ is 0.5. In other words, the value assigned for a neighbor match is a reduction of the value for an exact match.

In some embodiments, if the character in the candidate word is neither an exact match or a neighbor of the corresponding character in the input sequence, then the assigned value is $\beta N$, where $\beta$ is a constant and $\beta<\alpha<1$. For example, $\beta$ may be 0.25. In some other embodiments, $\beta$ may be a function of the "distance" between the characters on the keyboard layout. That is, $\beta$ may be a smaller number if the candidate word character is farther away on the keyboard layout from the input sequence character than if the candidate word character is closer on the keyboard layout from the input sequence character without being a neighbor.

More generally, the value assigned for a character comparison is $\gamma N$, where N is a predefined value, $\gamma=1$ for an exact match, and $\gamma$ may vary based on some function of the "distance" on the layout between the character in the candidate word and the corresponding character in the input sequence. For example, $\gamma$ may be 1 for an exact match, 0.5 for a neighbor, and 0 otherwise. As another example, $\gamma$ may be 0.5 for a neighbor (a 1-key radius), 0.25 for keys that are two keys away (a 2-key radius), and 0 for keys that are three or more keys away. In some embodiments, N is equal to 1.

If the candidate word has a length that is longer than the input sequence, or vice versa, then the character positions that are beyond the lesser of the two lengths are ignored or assigned a value of 0.

The first candidate word shown in FIG. 7A is "theater." Compared to the input sequence of "rheatre," there are exact matches in the second thru fifth positions. The characters in the first, sixth, and seventh positions of the candidate word are keyboard layout neighbors of input sequence characters in the corresponding positions. Thus, the score for "theater" in this case is 0.5N+N+N+N+N+0.5N+0.5N=5.5N.

The second candidate word is "threats." Compared to the input sequence of "rheatre," there is an exact match in the second position. The characters in the first, third, sixth, and seventh positions of the candidate word are keyboard layout neighbors of the input sequence characters in the corresponding positions, and the characters in the fourth and fifth positions of the candidate word are neither exact matches nor neighbors of the input sequence characters in the corresponding positions. Thus, the score for "threats" in this case is 0.5N+N+0.5N+0.25N+0.25N+0.5N+0.5N=3.5N.

The third candidate word is "there." Compared to the input sequence of "rheatre," there is an exact match in the second and third positions. The character in the first position of the candidate word is a keyboard layout neighbor of the input sequence character in the corresponding position, and the characters in the fourth and fifth positions of the candidate word are neither exact matches nor neighbors of the input sequence characters in the corresponding positions. Further-more, because the input sequence is two characters longer than the candidate word, the last two characters in the input sequence are ignored in the comparison and are assigned score values of 0. Thus, the score for "there" in this case is 0.5N+N+N+0.25N+0.25N=3N.

Some candidate words, when compared to the input sequence, may merit a score bonus, examples of which are shown in FIGS. 7B and 7C. In FIG. 7B, the input sequence is "thaeter" and the candidate word is "theater." The score based on the character comparisons alone is 5.5N. However, the only difference between "thaeter" and "theater" is a pair of transposed or swapped characters, namely "ae" in "thaeter" vs. "ea" in "theater." In some embodiments, a first bonus P is added to the score for this fact. In FIG. 7C, the input sequence is "thester" and the candidate word is "theater." The score based on the character comparisons alone is 6.5N. However, the only difference between "thester" and "theater" is a single character, namely "s" in "thester" vs. "a" in "theater." In some embodiments, a second bonus Q is added to the score for this fact. In some embodiments, both P and Q are equal to 0.75.

It should be appreciated that, in some other embodiments, alternative candidate word scoring and selection schemes other than the ones described above may be used.

For example, one alternative scheme may include, instead of dividing the candidate words into the first and second groups based on usage frequency rankings, the usage frequency rankings may instead be used as a weighting to be applied to candidate word scores. That is, the score of a candidate word is multiplied by the usage frequency ranking of the candidate word, and candidate words for presentation are selected based on their weighted scores.

As another example, another scheme replaces candidate word scoring based on character-by-character comparisons, as described above, with scoring based on the edit distance (also known as the Levenshtein distance) between the input sequence and the candidate word. That is, the score of a candidate word is the edit distance between the candidate word and the input sequence, or a function thereof, and candidate words are selected for presentation based on the edit distance scores. Alternately, the score for each candidate is based on the edit distance multiplied by (or otherwise combined with) the usage frequency ranking of the candidate, and candidate words are selected for presentation based on these scores.

As another example, another scheme uses a graph-matching technique. In this technique, the sequence of individual touch points that a user inputs into the device for a word (e.g., by contacts with a virtual keyboard on the touch screen) form a directed graph. This user-input directed graph is compared against a collection of directed graphs for respective words in a dictionary to generate a list of dictionary words that most closely match the user typing. In some embodiments, the probability that a user-input directed graph matches the directed graph for a dictionary word is calculated as follows:

Let $U_{1...n}$ be each point in the user-input directed graph.

Let $D_{1...n}$ be each point in the directed graph of a dictionary word. Points in this directed graph are assigned based on the centroid of the key that inputs the corresponding letter, as represented in the keyboard user interface.

Let $P_{1...n}$ be, for each point in the user-input directed graph, the probability that the letter corresponding to $U_x$ equals the letter corresponding to $D_x$. In some embodiments, a respective $P_x$ is computed by calculating the Euclidean distance between the points $U_x$ and $D_x$, and applying a factor based on the size of the user interface elements that indicate the keys on the keyboard. A minimum probability may be entered for $P_x$ if the graphs for the user word and the dictionary word are different lengths. In one embodiment, the factor (based on the size of the user interface elements that indicate the keys on the keyboard) is a divisor that is equal to, or proportional to, the distance between center points of two horizontally adjacent keys on the keyboard.

Multiplying the probabilities in $P_{1 \ldots n}$ together yields G, the probability that a graph for a dictionary word matches the user-input graph. In some embodiments, G is multiplied by F, the frequency that the word occurs in the source language/domain. Furthermore, in some embodiments G is also multiplied by N, a factor calculated by considering one or more words previously typed by the user. For example, in a sentence/passage being typed by a user, "to" is more likely to follow "going," but "ti" is more likely to follow "do re mi fa so la." In some embodiments, G is multiplied by both F and N to yield $\Omega$, the probability that a user-input directed graph matches a dictionary word.

The collection of dictionary words with the highest probabilities may be presented in a display for user consideration, for example as described in "Method, System, and Graphical User Interface for Providing Word Recommendations" (U.S. patent application Ser. No. to be determined 11/620,642, filed Jan. 5, 2007, the content of which is hereby incorporated by reference in its entirety. In other cases, the top-ranked word is selected for the user by the device without user intervention.

In some embodiments, as word recommendations are offered by the portable device and selected by the user, statistics regarding the corrections made are collected. For example, the characters in an input sequence that was replaced by a candidate word selected by the user and the corresponding characters may be logged. Over time, the corrections log may be analyzed for patterns that may indicate a pattern of repeated typing errors by the user. If the keyboard is a virtual keyboard on a touch screen of the portable device, the portable device may automatically adjust or recalibrate the contact regions of the keys of the virtual keyboard to compensate for the user pattern of typing errors. As another example, for a given input sequence, the word selected by the user may be recommended first or given a higher score when the same input sequence is subsequently entered by the user.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
   at a portable electronic device with a keyboard:
      receiving a sequence of input characters from the keyboard, wherein the keyboard has a predefined layout with a plurality of keys, each respective key in the plurality of keys corresponding to a single respective character, each respective key in the predefined layout having one or more neighbor keys;
      generating a set of strings from at least a subset of the sequence of input characters, the set of strings comprising permutations of respective input characters in the subset of the sequence and characters corresponding to neighbor keys of the keys corresponding to the respective input characters on the layout of the keyboard, wherein for each permutation:
         a respective character at a respective position in the permutation is either a corresponding input character at a corresponding position in the sequence of input characters or a character corresponding to an adjacent, neighbor key of the key corresponding to the corresponding input character in the predefined layout; and,
      after generating the set of strings:
         identifying in a dictionary one or more candidate words, each candidate word having a string in the set of strings as a prefix;
         scoring the candidate words;
         selecting a subset of the candidate words based on predefined criteria; and
         presenting the subset of the candidate words.

2. The method of claim 1, wherein scoring a respective candidate word comprises:
   comparing a respective character in each character position of the candidate word with a respective character in a corresponding position in the sequence of input characters; and
   determining a score for the respective candidate word based on the comparing.

3. The method of claim 2, wherein scoring the respective candidate word further comprises increasing the score of the respective candidate word if the respective candidate word, compared to the sequence of input characters, has only one character that is different.

4. The method of claim 2, wherein scoring the respective candidate word further comprises increasing the score of the respective candidate word if the respective candidate word, compared to the sequence of input characters, has only a set of transposed characters that are different.

5. The method of claim 1, wherein the keyboard comprises a virtual keyboard.

6. The method of claim 1, wherein the dictionary comprises a list of words and associated usage frequency rankings.

7. The method of claim 6, wherein the associated usage frequency rankings are tailored to the user based on previous input from the user.

8. The method of claim 6, wherein selecting a subset of the candidate words comprises organizing the candidate words into a first group and a second group, the first group comprising the candidate words having respective usage frequency rankings that exceed a threshold, the second group comprising the candidate words having respective usage frequency rankings that do not exceed the threshold; and
   wherein presenting the subset of the candidate words comprises presenting one or more of the candidate words of the first group in an order based on their scores.

9. The method of claim 8, wherein selecting a subset of the candidate words further comprises adding a candidate word of the second group into the first group if the candidate word of the second group has a score that exceeds a score of the highest scoring candidate word of the first group by a predefined margin.

10. The method of claim 8, wherein presenting the subset of the candidate words further comprises presenting a highest scoring candidate word of the second group.

11. The method of claim 1, further comprising presenting the sequence of input characters as a candidate word.

12. The method of claim 1, wherein the keyboard comprises a physical keyboard.

13. A computer readable storage medium storing one or more programs, the one or more programs comprising instructions, which when executed by a portable electronic device with a keyboard, causes the portable electronic device to perform a method comprising:

receiving a sequence of input characters from the keyboard, wherein the keyboard has a predefined layout with a plurality of keys, each respective key in the plurality of keys corresponding to a single respective character, each respective key in the predefined layout having one or more neighbor keys;

generating a set of strings from at least a subset of the sequence of input characters, the set of strings comprising permutations of respective input characters in the subset of the sequence and characters corresponding to neighbor keys of the keys corresponding to the respective input characters on the layout of the keyboard, wherein for each permutation:

a respective character at a respective position in the permutation is either a corresponding input character at a corresponding position in the sequence of input characters or a character corresponding to an adjacent, neighbor key of the key corresponding to the corresponding input character in the predefined layout; and, after generating the set of strings:

identifying in a dictionary one or more candidate words, each candidate word having a string in the set of strings as a prefix;

scoring the candidate words;

selecting a subset of the candidate words based on predefined criteria; and presenting the subset of the candidate words.

14. A portable electronic device, comprising:

a display;

a keyboard, the keyboard having a predefined layout with a plurality of keys, each respective key in the plurality of keys corresponding to a single respective character, each respective key in the predefined layout having one or more neighbor keys;

one or more processors;

memory; and one or more programs, wherein the one or more programs are stored in the memory and configured to be executed by the one or more processors, the one or more programs including:

instructions for receiving a sequence of input characters from the keyboard;

instructions for generating a set of strings from at least a subset of the sequence of input characters, the set of strings comprising permutations of respective input characters in the subset of the sequence and characters corresponding to neighbor keys of the keys corresponding to the respective input characters on the layout of the keyboard, wherein for each permutation:

a respective character at a respective position in the permutation is either a corresponding input character at a corresponding position in the sequence of input characters or a character corresponding to an adjacent, neighbor key of the key corresponding to the corresponding input character in the predefined layout; and, after generating the set of strings:

instructions for identifying in a dictionary one or more candidate words, each candidate word having a string in the set of strings as a prefix;

instructions for scoring the candidate words;

instructions for selecting a subset of the candidate words based on predefined criteria; and instructions for presenting the subset of the candidate words.

15. A portable electronic device, comprising:

display means;

input means, the input means having a predefined layout with a plurality of keys, each respective key in the plurality of keys corresponding to a single respective character, each respective key in the predefined layout having one or more neighbor characters;

one or more processor means;

memory means; and a program mechanism, wherein the program mechanism is stored in the memory means and configured to be executed by the one or more processors means, the program mechanism including:

instructions for receiving a sequence of input characters from the input means;

instructions for generating a set of strings from at least a subset of the sequence of input characters, the set of strings comprising permutations of respective input characters in the subset of the sequence and characters corresponding to neighbor keys of the keys corresponding to the respective input characters on the layout of the input means, wherein for each permutation:

a respective character at a respective position in the permutation is either a corresponding input character at a corresponding position in the sequence of input characters or a character corresponding to an adjacent, neighbor key of the key corresponding to the corresponding input character in the predefined layout; and, after generating the set of strings:

instructions for identifying in a dictionary one or more candidate words, each candidate word having a string in the set of strings as a prefix;

instructions for scoring the candidate words;

instructions for selecting a subset of the candidate words based on predefined criteria; and instructions for presenting the subset of the candidate words.

* * * * *

UNITED STATES PATENT AND TRADEMARK OFFICE
CERTIFICATE OF CORRECTION

| | | |
|---|---|---|
| PATENT NO. | : 7,957,955 B2 | Page 1 of 1 |
| APPLICATION NO. | : 11/620641 | |
| DATED | : June 7, 2011 | |
| INVENTOR(S) | : Greg Christie et al. | |

It is certified that error appears in the above-identified patent and that said Letters Patent is hereby corrected as shown below:

In column 10, line 26, delete ""S,"" and insert -- "S." --, therefor.

In column 10, line 46, delete ""w," and "s,"" and insert -- "w," "s," --, therefor.

In column 13, line 22, delete "to be determined 11/620,642," and insert -- 11/620,642, --, therefor.

Signed and Sealed this
Twenty-ninth Day of November, 2011

David J. Kappos
*Director of the United States Patent and Trademark Office*